(12) United States Patent
Parker et al.

(10) Patent No.: US 9,682,689 B2
(45) Date of Patent: Jun. 20, 2017

(54) EMERGENCY BRAKING SYSTEM FOR A VEHICLE

(71) Applicant: Jaguar Land Rover Limited, Coventry (GB)

(72) Inventors: Dirk Parker, Coventry (GB); Kevin Cockings, Coventry (GB); Mark Cund, Coventry (GB)

(73) Assignee: Jaguar Land Rover Limited, Whitley, Coventry (GB)

( * ) Notice: Subject to any disclaimer, the term of this patent is extended or adjusted under 35 U.S.C. 154(b) by 0 days.

(21) Appl. No.: 14/773,776

(22) PCT Filed: Mar. 10, 2014

(86) PCT No.: PCT/EP2014/054551
§ 371 (c)(1),
(2) Date: Sep. 9, 2015

(87) PCT Pub. No.: WO2014/139930
PCT Pub. Date: Sep. 18, 2014

(65) Prior Publication Data
US 2016/0016560 A1    Jan. 21, 2016

(30) Foreign Application Priority Data

Mar. 11, 2013  (GB) .................................. 1304314.6

(51) Int. Cl.
*B60W 30/09*        (2012.01)
*B60T 7/22*         (2006.01)
(Continued)

(52) U.S. Cl.
CPC ................ *B60T 7/22* (2013.01); *B60T 8/171* (2013.01); *B60W 30/09* (2013.01); *B60W 10/18* (2013.01);
(Continued)

(58) Field of Classification Search
CPC combination set(s) only.
See application file for complete search history.

(56) References Cited

U.S. PATENT DOCUMENTS

2004/0030499 A1    2/2004  Knoop et al.
2009/0299578 A1   12/2009  Lucas et al.
(Continued)

FOREIGN PATENT DOCUMENTS

DE    10 2008 061301 A1    6/2009
DE    10 2009 000401 A1    7/2010
(Continued)

OTHER PUBLICATIONS

Combined Search and Examination Report, GB 1304314.6, Aug. 27, 2013, 6 pages.
(Continued)

*Primary Examiner* — Edward J Pipala
(74) *Attorney, Agent, or Firm* — Myers Bigel, P.A.

(57) ABSTRACT

An intelligent emergency braking system for a vehicle includes a camera, an ultrasonic transceiver of a parking aid system, and a computer. The camera is configured to provide captured image data, and the transceivers are configured to provide transceiver data. The computer processes the image and transceiver data and invokes automatic braking if the following conditions exist: the confidence with which the computer calculates that a detected object is a person or is an object vehicle exceeds a first predetermined level, and the ultrasonic transceiver provides the computer with transceiver data consistent with the object detected through the captured image data.

19 Claims, 2 Drawing Sheets

(51) Int. Cl.
*B60T 8/171* (2006.01)
*B60W 10/18* (2012.01)
(52) U.S. Cl.
CPC ..... *B60W 2420/42* (2013.01); *B60W 2420/54* (2013.01)

(56) References Cited

U.S. PATENT DOCUMENTS

| 2011/0125372 | A1* | 5/2011 | Ito | B60R 21/0132 701/45 |
| 2012/0235853 | A1* | 9/2012 | Takeuchi | B60W 30/09 342/71 |
| 2012/0296524 | A1* | 11/2012 | Kido | B60K 35/00 701/41 |
| 2013/0110368 | A1* | 5/2013 | Zagorski | B60T 7/22 701/70 |
| 2015/0332590 | A1* | 11/2015 | Salomonsson | G08G 1/167 701/28 |

FOREIGN PATENT DOCUMENTS

| JP | 2005 202878 A | 7/2005 |
| JP | 2005 329779 A | 12/2005 |
| KR | 10-2012-0035325 A | 4/2012 |

OTHER PUBLICATIONS

International Search Report, PCT/EP2014/054551, Sep. 15, 2014, 8 pages.

\* cited by examiner

EMERGENCY BRAKING SYSTEM FOR A VEHICLE

RELATED APPLICATIONS

This application is a 35 U.S.C. §371 national stage application of PCT Application No. PCT/EP2014/054551, filed on Mar. 10, 2014, which claims priority from Great Britain Patent Application No. 1304314.6, filed on Mar. 11, 2013, the contents of which are incorporated herein by reference in their entireties. The above-referenced PCT International Application was published in the English language as International Publication No. WO 2014/139930 A2 on Sep. 18, 2014.

TECHNICAL FIELD

This invention relates to a vehicle including an emergency braking system.

BACKGROUND

Many accidents are caused by late braking and/or braking with insufficient force. A driver may brake too late for several reasons: he/she is distracted or inattentive; visibility is poor, for instance when driving towards a low sun; or a situation may be very difficult to predict because the driver ahead is braking unexpectedly. Most people are not used to dealing with such critical situations and do not apply enough braking force to avoid a crash.

Intelligent Emergency Braking (IEB) systems improve safety in two ways: firstly, they help to avoid accidents by identifying critical situations early and warning the driver; and secondly they reduce the severity of crashes which cannot be avoided by lowering the speed of collision and, in some cases, by preparing the vehicle and restraint systems for impact.

Most IEB systems use radar or lidar-based technology to identify potential obstacles ahead of the car. This information is combined with what the car knows of its own travel speed and trajectory to determine whether or not a critical situation is developing. If a potential collision is detected, IEB systems generally (though not exclusively) first try to avoid the impact by warning the driver that action is needed. If no action is taken and a collision is still expected, the system will then apply the brakes. Some systems apply full braking force, others an elevated level. Either way, the intention is to reduce the speed with which the collision takes place. Some systems deactivate as soon as they detect avoidance action being taken by the driver.

A known system is designed to help avoid or to mitigate accidents involving collisions with the rear of preceding traffic, either moving or stationary. Two long range radars, positioned at the front of the car, detect vehicles ahead which the car is likely to hit unless action is taken. The information from the front radars is combined with data from a windscreen-mounted camera to calculate the likelihood of an impact. The system uses escalating measures at certain critical points to try to help the driver avoid an accident. Firstly, when the system calculates that a collision is likely, it issues optical and acoustic warnings and pre-fills the braking system in preparation for an avoidance manoeuvre by the driver. If the driver does not react and the criticality increases a further warning is given: a small braking jolt serves as a 'haptic' warning, encouraging a driver reaction. At the same time, the brakes are prepared so that if the driver does brake, to whatever extent, the system will automatically apply the appropriate braking force to avoid or mitigate the collision. At the same time, slack is removed from the seat belts. If there is still no reaction from the driver, the system applies partial braking to try to mitigate a collision. Finally, when an accident can no longer be prevented, the system autonomously applies maximum braking to reduce the severity of the collision. The hazard warning lights are automatically turned on to warn other road users. The system is designed to operate at speeds up to 200 km/h.

Another known system, which helps to avoid or to mitigate accidents at speeds up to 30 kilometers per hour (kph) uses a lidar (Light Detection And Ranging) sensor positioned at the top of the windscreen. This scans the area up to around 7.6 m ahead of the vehicle for possible obstacles. If the vehicle detects a braking, slower-moving or stationary vehicle in front and it determines that a collision is likely, the brakes are pre-charged. If the driver remains inactive (no steering or braking input), the car applies the brakes automatically and reduces engine torque.

At relative speed differences less than 15 kph the system may help the driver to entirely avoid the collision with the obstacle in front. If the relative speed difference between the two vehicles is between 15 and 30 kph the impact is unavoidable through braking alone but the system will aim to reduce speed prior to the impact. If the driver intervenes to try to avoid the accident, either by accelerating hard or by steering, the system deactivates.

The foregoing description applies primarily to the situation where the vehicle is detecting an object such as another "object vehicle" which the vehicle (henceforth the "subject vehicle", being the vehicle in which the emergency braking system is fitted) is following. Systems for detecting object vehicles are reasonably robust and it is unlikely (and this is very important) that there will be any false-positives in the sense of detecting something and applying the brakes, either temporarily or fully, when there is no object to be detected.

However, camera image processing technology is becoming sophisticated enough to reliably detect, with a high probability of being correct, adult pedestrians. Thus some braking systems are invoked when pedestrians are detected in the path of a subject vehicle. Again, such invocation cannot reasonably be commenced before a collision becomes inevitable because drivers need to remain in control of, and be responsible for the driving of, their vehicles. It is simply not acceptable for the vehicle unnecessarily to take control itself. On the other hand there are measures that can be taken. For example the braking system can ready itself for emergency braking by a preliminary pressurisation of the braking system, so that when the brake pedal is pressed, braking is instantaneous. Also, driver braking can be assisted by applying the brakes harder than the driver applies if the system calculates that faster braking is possible.

Thus, instead of detecting other vehicles, some known systems are designed to detect pedestrians and other vulnerable road users. Images from a forward-looking camera are analysed to identify shapes and characteristics typical of humans. The way in which they are moving relative to the path of the vehicle is calculated to determine whether or not they are in danger of being struck. If so, the IEB system applies full braking to bring the car to a halt and, at the same time, it may issue a warning to the driver. Predicting human behaviour is difficult and the algorithms used in pedestrian detection systems are very sophisticated. The system must be able to react properly to a valid threat but must not apply the brakes where there is no danger e.g. where a pedestrian is walking to the edge of the pavement but then stops to allow the car to pass. These systems invariably employ a camera combined with a radar "sensor fusion". New technologies are appearing on the market that use infra-red and can also operate in very low light conditions.

Euro NCAP (www.euroncap.com) was established in 1997, and is composed of seven European Governments as well as motoring and consumer organisations in every European country. Euro NCAP organizes crash-tests and provides motoring consumers with a realistic and independent assessment of the safety performance of some of the most popular cars sold in Europe. Euro NCAP makes recommendations and sets standards that automatic braking systems need to meet to be approved by Euro NCAP before they can become marketable products for use in vehicles. Presently, pedestrian recognition systems must, with a substantial level of confidence (as much as 98% or more), be capable of identifying pedestrians greater than 1.2 meters tall. It is not a requirement that systems recognise smaller pedestrians such as children. This is obviously not because children are unimportant, but simply reflects the reality that technology is not precise enough to reliably distinguish small humans from other objects of a similar size.

The 98% level of confidence calculated by the system is the probability that a detected object is a pedestrian. Needless to say, if an object such as a small child is reliably identified as such, with that level of confidence, then brakes will be automatically applied in appropriate circumstances as discussed above (or as particular manufacturers prefer). However, it is not expected that reliable identification can be guaranteed for pedestrians (objects) less than 1.2 meters tall.

In 2014 calendar year all new cars that are launched into the market will be tested under new Euro NCAP rules. The effect of the new testing will be that a car must provide a level of autonomous collision avoidance and autonomous collision mitigation with another car if it is to be rated as a 5-Star vehicle.

However, camera systems that are capable of delivering such discrimination are fundamentally very complex and sophisticated and necessarily expensive. A far less sophisticated camera system is employed to recognise road signs and warn drivers of speed limits and the like. Recognising road signs is relatively trivial and can be achieved by a less sophisticated camera system.

Parking Distance Control (PDC) systems typically employ ultrasonic sensors. These are short range devices and are used to give warning of very close objects around a vehicle to assist a driver in parking or close manoeuvring of a vehicle. JP-A-2008/049932 appears to disclose the use of ultrasonic sensors and cameras to assist in manoeuvring of a vehicle including applying brakes when an object is about to be hit. PDC systems can prevent collisions when the vehicle is travelling as fast as 8 or 9 kph. The reason for this is that the range of current ultrasonic systems is little more than about 4 meters, so at speeds beyond about 15 kph the time permitted is generally insufficient even to mitigate the effects of a collision. However, coded ultrasonic sensors can increase the range of ultrasonic devices to up to 15 or 20 meters. Ultrasonic systems employ an ultrasonic transceiver that detects reflections of ultrasonic pulses. Such systems can be susceptible to many false positives. They require time in which to analyse signals received and to filter out spurious reflections from items which lie outside the path of the vehicle, e.g. street furniture etc.

It is an aim of the present invention to provide an improved IEB system.

SUMMARY OF THE INVENTION

Aspects of the invention provide a system, a method and a vehicle as claimed in the appended claims.

In accordance with an aspect the invention there is provided a braking system suitable for incorporation in a subject vehicle comprising:
  a) a first detector, being a camera;
  b) a second detector, being an ultrasonic transceiver; and
  c) a computer, wherein
  d) the camera is adapted to provide the computer with captured image data and the computer is adapted to process the captured image data to detect objects in the field of view of the camera;
  e) the ultrasonic transceiver is adapted to provide the computer with transceiver data and the computer is adapted to process the transceiver data to detect objects in the field of detection of the transceiver; and
  f) the computer is adapted automatically to issue a command to invoke the subject vehicle braking system in the event that:
    i. the confidence with which the computer calculates on the basis of the captured image data that there is an object in its field of view with which the subject vehicle will collide exceeds a first level of confidence; and
    ii. the ultrasonic transceiver provides the computer with transceiver data consistent with the object detected through the captured image data.

The braking system may comprise an intelligent emergency braking (IEB) system.

The ultrasonic transceiver may be a component of a parking distance control further comprising a park aid module connected to the ultrasonic transceiver; and/or a camera module may be connected to the camera; and said computer may be one of the park aid module, the camera module and a separate computer. The park aid module and/or camera module may be integrated in said separate computer.

When fitted in a subject vehicle, the two detectors are forward facing. By "forward-facing" is meant, throughout this specification, "facing the direction of travel" of the vehicle. Normally, this direction would, of course, be frontal (with respect to a front end of the vehicle) for when a vehicle is progressing in the direction in which its front end is pointing. However, it is also within the ambit of the present invention that "forward-facing" includes in the reverse direction, for when the vehicle is reversing. Thus, the system of the present invention could include a camera and an ultrasonic transceiver facing in a frontal direction and/or in reverse direction with respect to the front end of the vehicle when fitted therein.

Thus, in the present invention, the camera does not need to be so sophisticated that it can detect itself with requisite certainty objects to be avoided. It merely needs to have the confidence that there is, potentially, an object within the image it is receiving, and that that confidence exceeds a certain, perhaps relatively low level of, confidence. Likewise, the ultrasonic transducer does not need to process reflections it receives in order to eliminate spurious reflections. Instead it can enable the computer to confirm that a camera image it considers potentially to be an object is indeed an object because, as soon as the object gets into the range of the ultrasonic transceiver (a distance/direction known to the computer) and the transceiver receives an expected reflection, the computer's confidence that the object really is an object to be avoided can immediately be raised to a sufficient level to invoke the vehicle's braking system.

In one embodiment, the computer automatically invokes the braking system of the subject vehicle in the event that:

i. the confidence with which the computer calculates that a detected image captured by the camera is an object exceeds a second predetermined level, higher than said first level; and
ii. the subject vehicle will collide with the object.

The capacity of the system to react only to image data from the camera before the ultrasonic transceiver confirms the existence of the object, from reflections it receives, depends on a number of factors including the sophistication of the camera and its object detection algorithms, as well as the light conditions and the clarity of the image received of the object. However, it is at least a feature of the present invention that it provides a level of intelligent emergency braking even with a less sophisticated camera system, or where light conditions are such that object detection cannot be determined, even with a sophisticated camera system, to a sufficiently reliable degree of confidence. This is bearing in mind that a false positive resulting in unnecessary vehicle braking could lead to an undesirable result of equal or greater magnitude than failing to react at all in respect of a real object.

Likewise, in another embodiment, the computer automatically invokes the braking system of the subject vehicle in the event that:
i. the confidence with which the computer calculates that the transceiver data of a detected reflection is from an object exceeds a third predetermined level; and
ii. the subject vehicle will collide with the object.

Again, the capacity of the system to react solely in response to transceiver data depends on the sophistication of the ultrasonic transceiver and its object detection algorithms, as well as on environmental conditions. It is unlikely, but not impossible, that light conditions are such that no image captured by the camera is calculated to be an object. This might occur in the dark, or in fog, or even if an object comes in front of the vehicle beneath the line of sight of the camera. In this event, it may be desirable for the IEB to be actuated despite the camera failing to provide any pre-warning. However, in this event, the system is unlikely to be of great benefit unless the speed of the subject vehicle (relative to the object) is low.

The captured image data by the camera may be from light or other radiation reflected from objects. The transceiver data is from reflected ultrasound originating from a transceiver on the subject vehicle.

The transceiver data may be considered "consistent" with the object detected through the captured image data if an ultrasound reflection is received either from an object within the same distance as the detected object or from the same direction as the detected object, or both.

Thus, in the event that an image detected by the camera cannot be ascertained with the requisite certainty that the computer immediately and automatically invokes the vehicle braking system, the computer instead is prepared to react more rapidly, as soon as the ultrasonic transceiver detects the object, than it would react if relying exclusively on the transceiver data. Of course, as soon as the computer determines that an object is a person, the vehicle braking systems will be operated, regardless of which detector is responsible for the computer making the determination, or whether the other detector corroborates the conclusion or not.

When the computer determines that a detected object is a person with a level of confidence between said first and second levels, the computer may prepare the subject vehicle in anticipation of confirmation of the presence of an object by the transceiver. Said preparation of the subject vehicle for immediate braking may comprise pre-charging of a hydraulic system driving the subject vehicle brakes.

Optionally, said vehicle braking system comprises at least one of:
pre-charging the brake hydraulic system in readiness for driver- or computer-initiated braking;
issuing audible, visual and/or haptic warning signals of a detected object vehicle or person, a haptic warning signal including the option of a temporary application of the brakes of the vehicle;
force assistance for driver-actuated brakes;
full brake actuation; and
third party warning systems, such as flashing direction indicator lights.

Full brake actuation means, of course, ensuring maximum deceleration of the subject vehicle as is possible to achieve, most likely involving use of a system to prevent locking of any of the vehicle's wheels. Such full brake actuation may be implemented when force assistance is provided after a driver actuates the vehicle's brakes and yet the rate of deceleration could be improved to reduce the speed of the vehicle at collision.

Automatic operation by the computer of the vehicle braking system may be disabled as soon as the driver assumes responsibility for evasion/avoidance of a collision by appropriate steering, braking or acceleration. However, force assistance may be retained where the driver action is merely application of the vehicle's brakes.

While the systems of the present invention are invoked when a collision is inevitable and unavoidable, some of the vehicle's braking system may be invoked by the computer when the relative speeds of the subject vehicle and a detected object and their separation are such that the condition of an inevitable and unavoidable collision is about to happen. The term "about to happen" means that, without corrective action, a collision will become inevitable within a predetermined future period of time. Such period of time may be set as five seconds or less, optionally three seconds, optionally one second.

Said vehicle braking systems invoked during said future time period may comprise:
pre-charging the brake hydraulic system in readiness for braking; and
issuing audible, visual and/or haptic warning signals of a detected object vehicle or person, a haptic warning signal including the option of a temporary application of the brakes of the vehicle.

The ultrasonic transceiver may be a component of a park aid system providing distance information to a driver of objects adjacent the vehicle during parking and other manoeuvres of the subject vehicle.

The computer may comprise two distinct algorithms running in separate processors, one in a camera module and one in a park aid module of the vehicle, wherein each algorithm has a tracking algorithm to determine whether a detected object by either module is an object in front of the vehicle, a signalling mechanism in the park aid module sending a signal to the camera module when it detects an object, and the camera module determining a braking decision to invoke the vehicle braking system on detection of an object by the camera when the level of confidence that a captured image is an object exceeds said first level.

A braking decision by the computer on detection of an object, wherein the level of confidence exceeds said first level, may be through a single algorithm running in one of a camera module or a park aid module, with communication of respective detected object data being passed from the other of said camera and park aid modules.

When the computer determines with a level of confidence greater than said first level (and optionally less than said second level) that a captured image is of an object, the ultrasonic transceiver may issue a higher power pulse than a normal pulse when the vehicle is at a point with respect to the suspected object beyond the PDC's normal range to determine if the object can be detected sooner than it would otherwise be detected when such normal power pulses are issued.

In another aspect, the present invention provides a method of operating a braking system of a subject vehicle, the method comprising:
a) providing the subject vehicle with a first detector, being a forward-facing camera;
b) providing the subject vehicle with a second detector, being a forward-facing ultrasonic parking distance control transceiver; and
c) processing captured image data from the camera to detect objects in front of the subject vehicle;
d) processing transceiver data from the ultrasonic transceiver to detect objects in front of the subject vehicle; and
e) automatically invoking the subject vehicle braking system in the event that:
  i. the confidence with which captured image data is calculated to be an object in front of the subject vehicle, and with which the subject vehicle will collide, exceeds a first level of confidence; and
  ii. the ultrasonic transceiver provides transceiver data consistent with the object detected through the captured image data.

Optionally, the method further comprises invoking the subject vehicle braking system in the event that:
  i. the confidence with which captured image data is calculated to be an object in front of the subject vehicle exceeds a second predetermined level, higher than said first level; and
  ii. the subject vehicle will collide with the object.

In another aspect, the present invention provides an intelligent emergency braking (IEB) system suitable for incorporation in a vehicle comprising:
a first detector, being a forward-facing camera and a camera module;
a second, detector being a forward-facing ultrasonic parking distance control transceiver and a park aid module; and
an algorithm in a computer, which computer is one of the camera module, the park aid module and a separate computer, wherein the algorithm calculates the level of confidence with which a camera image captured by the camera is an object and, if the level of confidence is less than required for invocation of a command for emergency braking of a vehicle in which the system is fitted but is greater than a predetermined minimum, the computer invokes said command if the ultrasonic transceiver provides the park aid module with transceiver data that is consistent with the object detected through the captured image data.

Where the computer is a separate computer, it may have integrated within it the camera module and/or the park aid module, both modules being computing units adapted to handle the data generated by the respective detector, either of which modules may be located adjacent the respective detector or remote from it.

Thus the present invention finds a further application of ultrasonic PDC sensors that are a generally an option fit on the front bumpers of vehicles. In this further application the ultrasonic PDC sensors are used to sense or confirm the sensing of smaller pedestrians. Current PDC sensors have a range of approximately 4 meters (m). However, it is proposed that there will be sensors available that have an extended range of perhaps 15 m. This will increase the speed range over which PDC sensors will be of use. A 4 m range of PDC sensor could theoretically cater for speeds between 0 and 15 kph. An increased range of 15 m could theoretically cater for speeds between 0 and 37 kph.

Thus, in one embodiment of the system, the range of the ultrasonic transceiver is between 10 and 20 m. Indeed, the ultrasonic transceivers may issue coded pulses of ultrasound, whereby the original source of a detected reflection may be determined from the code of the detected reflection.

It is clear that longer range ultrasonic sensors are of greater use and will cover approximately 50% of pedestrian tests currently proposed by Euro NCAP, which range in vehicle speeds from 10 to 60 kph. An integrated approach between camera and ultrasound park sensor technology could pre-empt a single central decision maker and enable greater confidence of brake decisions in more situations.

Within the scope of this application it is expressly intended that the various aspects, embodiments, examples and alternatives set out in the preceding paragraphs, in the claims and/or in the following description and drawings, and in particular the individual features thereof, may be taken independently or in any combination. Features described in connection with on embodiment or aspect are applicable to all other embodiments or aspects, unless incompatible therewith.

BRIEF DESCRIPTION OF THE DRAWINGS

Embodiments of the invention are further described hereinafter, by way of example only, with reference to the accompanying drawings, in which.

DETAILED DESCRIPTION

Figure 1:
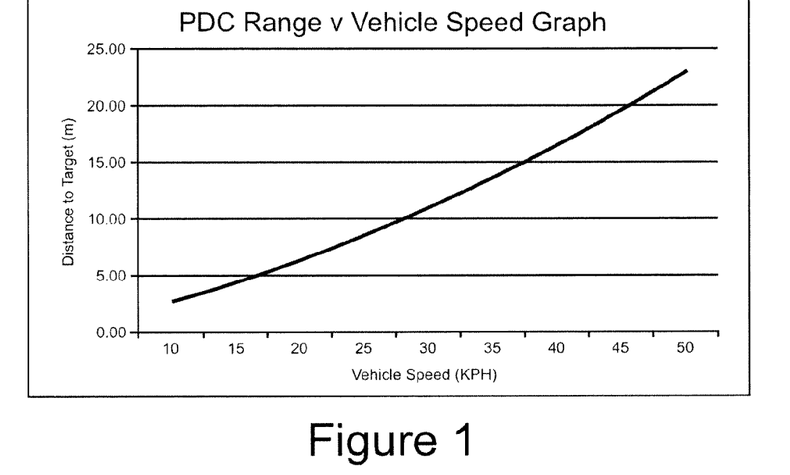
FIG. 1 is a graph of parking distance control (PDC) range against vehicle speed.

In FIG. 1, a graph is plotted of the distance from a target that a PDC system is capable of detecting against vehicle speed. The graph uses equation (1) below to calculate the range (R) required to effect braking, taking into account the estimated transport delays in the system:

$$R = v*T_{PDC} + v*T_{BD} + SO + v^2/2a \qquad (1)$$

Where v is the vehicle speed, $T_{PDC}$ is the time it takes a system, the PDC, to make a decision (typically 0.3 seconds (s)), $T_{BD}$ is the time for the brakes to start operating and decelerating the vehicle (typically 0.3 s), SO is the distance from the object at which the vehicle should at a minimum come to a complete halt, a is the maximum deceleration (which depends on many environmental factors not possible to control, but typically may be set at 8.2 ms$^{-2}$).

Equation (1) is based upon the following kinematic equation of linear motion:—

$$r = \frac{v^2}{2a} \quad (2)$$

From the graph it can be seen that with a range of 15 m, a PDC can operate at speeds up to 35-40 kph. However, if the decision time $T_{PDC}$ can be reduced and, what is more, if the range can be "extended" by not requiring such confidence in the detection that it alone is used as the basis for a decision, then the effective range of the system can be increased still further. The range is capable of extension by using a camera system to effectively prime the decision maker in readiness to detect an object.

Figure 2:
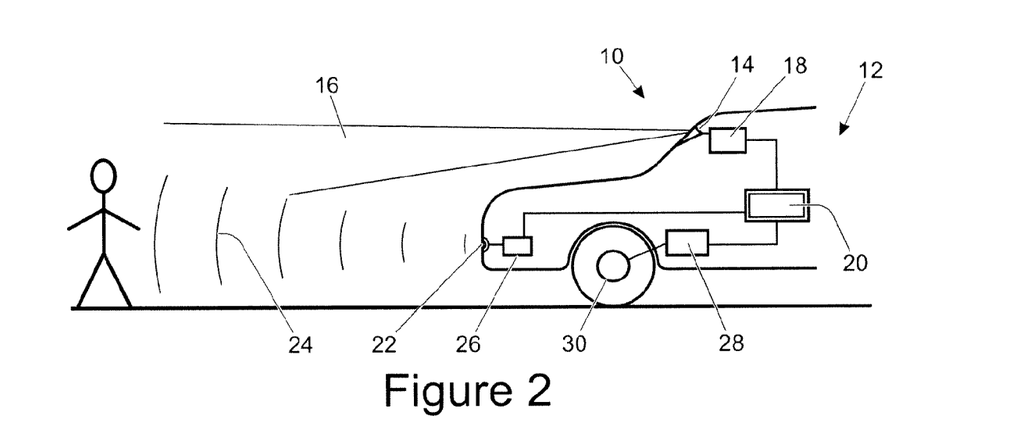
FIG. 2 is a schematic side view of a vehicle equipped with a system in accordance with the present invention.

Turning to FIG. 2, a vehicle 10 is equipped with an intelligent braking system 12 in accordance with the present invention. The system 12 comprises a forward facing (video) camera 14 having a field of view 16 and a camera module 18 connected thereto. The module 18 communicates with a computer 20. The vehicle is also provided with front PDC transceivers 22 emitting ultrasonic pulses over a field 24 in front of the vehicle. The transceivers are connected to a PDC module 26, which is itself in communication with the computer 20.

The computer 20 may be connected to, or be part of, either of the camera module 18 or PDC module 26. The computer 20 communicates with the vehicle's emergency braking system 28 that ultimately is adapted to operate the vehicle's brakes 30.

The camera system 14 may be supplemented with a radar system to detect traffic in front of the vehicle and this is useful primarily at higher speeds and distances to objects detected, for example over distances of several hundred meters and vehicle speeds in excess of 100 kph. This system helps to prevent collisions with vehicles on the road, for example tail-end collisions when vehicles in front of the driver slow or stop unexpectedly. However, detecting pedestrians at this speed and distance is not entirely practical or desirable. This is more desirable at slower speeds (less than about 60 kph) and closer range (less than about 30 m). In this event, the images captured by a camera, optionally together with radar (and/or lidar) information, can be processed by the computer 20 (or directly by the camera module 18) to detect that an image captured in front of the vehicle is a pedestrian with a high degree of confidence. However, before implementing any emergency provisions, not only must that confidence be very high, but also the subject vehicle must be in imminent danger of reaching a position where an inevitable collision with the pedestrian will occur. When these conditions prevail, the vehicle's intelligent emergency braking system can be activated, either to warn the driver or begin emergency braking.

The consequences posed by false positives in this situation can be serious. The risks of them occurring must be reduced to a very low level. Unfortunately, this also means that false negatives become an issue and this is particularly the case with smaller pedestrians for whom a false negative is more likely than with an adult. This is simply a question of the size of the features of small versus larger humans, as well as the possibility that other objects such as roadside bollards are more similarly sized with children than with adults. In any event, camera systems with which the present invention is also potentially (indeed, very likely) concerned may not have the sophistication to make any substantive determination on its own that an image is that of an object, let alone that the object is a human.

With more sophisticated systems, algorithms for analysing images and determining the nature of an object return a level of confidence that a determination is correct. Because of the dangers of false negatives, Euro NCAP only approve systems that have a 98% success rate in detecting humans greater than 1.2 m tall, and to activate braking systems only when that level of confidence is achieved. However, such algorithms are also capable of concluding that an object may be a human, but only with a level of confidence of a lesser percentage.

The present invention proposes to employ the front sensors of a PDC system to corroborate the findings of a camera system so that the level of confidence of the combined system can reach an acceptably high level to initiate the IEB sooner than would be the case if the camera system is used alone. Of course, the PDC system comprising the transceivers 22 and PDC module 26 independently emit ultrasonic pulses and detect reflections from objects. Multiple transceivers may be disposed across the front of a vehicle to provide a wide field of view, in total, but also to enable a narrow beam of ultrasound pulses to be emitted from each transceiver, so that the direction of objects detected by reflections therefrom may be ascertained. However, a problem with current transceivers is that a reflection may be received from a pulse emitted by another transceiver and in this event a false calculation of distance may made. Indeed, general interference between signals may reduce the effectiveness of the detection of objects. Of course, the closer the transceiver is to an object, the less problematic interference becomes and the stronger are the reflections that occur. To increase the range of transceivers, it is proposed to encode the signals so that a reflection contains the code and its provenance is thereby assured. This enables much weaker reflections to be recognised and processed. However, if the distance to and direction of an object is known or suspected (through use of the camera) then a reflection can be even weaker still and yet, if it bears the appropriate time stamp and direction, can confidently be acknowledged as a true reflection from the known or suspected object.

Consequently, in the event that the camera system detects what appears to be an object, but cannot with sufficient confidence determine the nature or existence of the object so as to activate the vehicle's IEB system, it can, when the vehicle comes within PDC range of the object, communicate the position and distance of the object to the PDC system. That system can then seek out the object and confirm to the camera system that an object is indeed present in front of the vehicle.

In one embodiment, if the camera detects an object with insufficient confidence to commence braking, it can demand a higher power pulse of the ultrasonic transceiver at a point when the detected object appears to be beyond the PDC's normal range to see if the object can be detected sooner than it would otherwise be detected with sufficient confidence itself to activate the vehicle braking system.

Figure 3:
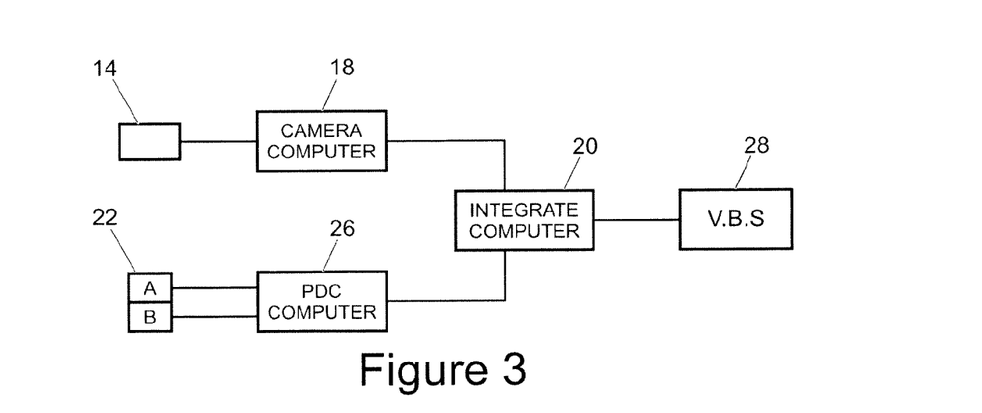
FIG. 3 is a schematic representation of one embodiment of a control system in accordance with the present invention.

Thus, turning to FIG. 3, camera 14 transmits captured image data to camera module or computer 18 which in turn notifies integrate computer 20 of the detections it makes. Similarly, and independently, transceiver 22 (comprising emitter A and sensor B) transmits sensed reflections to the PDC module or computer 26 which in turn notifies integrate computer 20 of the detections it makes. Integrate computer 20 can initiate emergency braking commands to the vehicle's braking system 28 on the basis of notifications from either the camera computer or PDC computer. However, the integrate computer further has the possibility of integrating the notifications from the camera system and PDC system to increase the level of confidence that a detection of an object is to be acted upon. Indeed, the integrate computer 20, on receipt of a notification from either the camera or PDC system that is not sufficient alone to act upon, can notify the other of the camera or PDC system to "look" at the object detected by the first and confirm, if it can, its existence.

Figure 4:
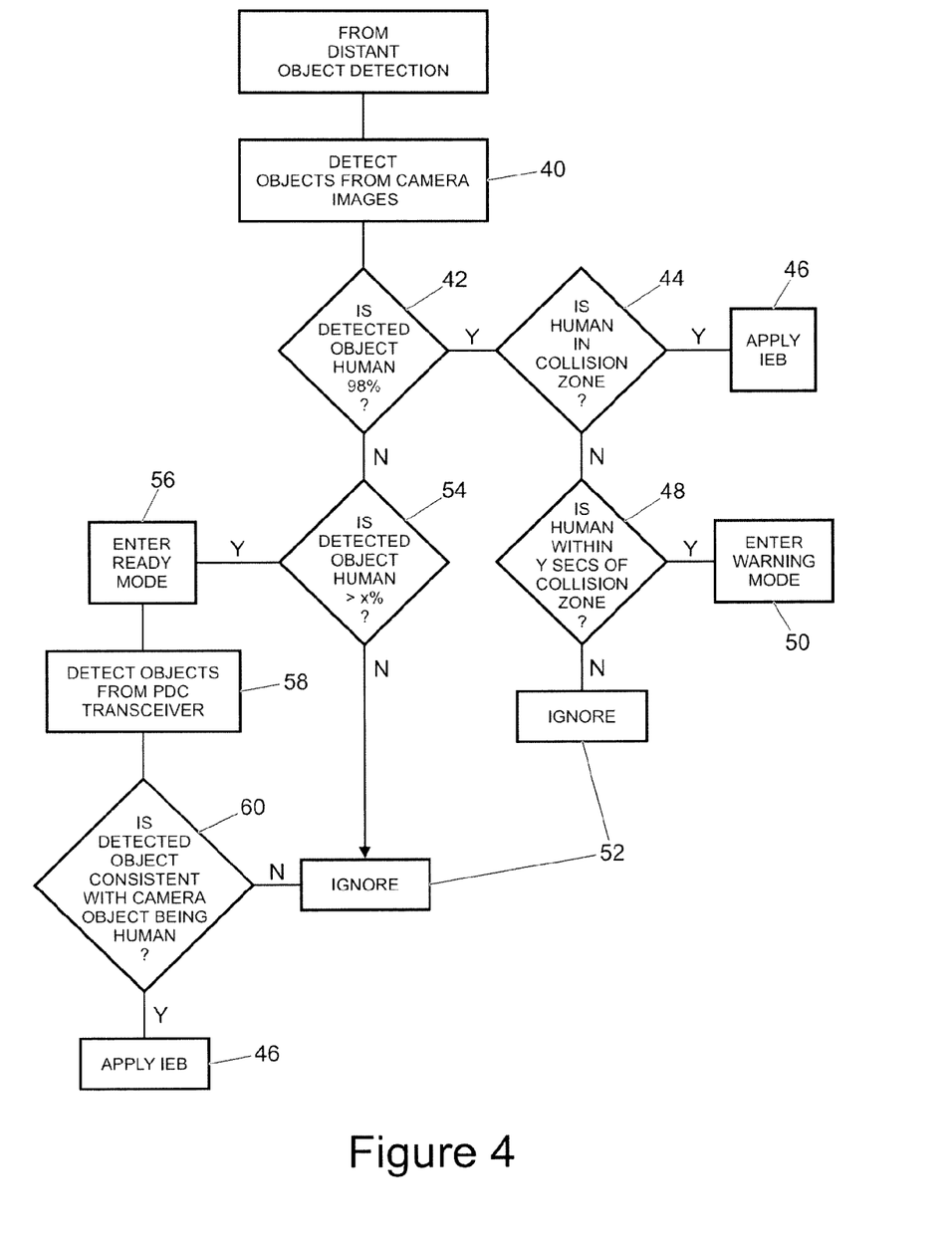
FIG. 4 is a flow diagram of a process in accordance with the present invention.

Turning to FIG. 4, a flowchart of events is illustrated. The start is the camera detecting objects in its range, in step 40. A determination is made in step 42 as to whether any detected object is human, with a confidence level greater than 98%. If the answer is positive, then a determination is made in step 44 as to whether, on the current trajectory and speed of the vehicle, and any movement of the human, a collision with the human is inevitable. If the determination is again positive, the intelligent emergency braking system (IEB) is immediately implemented in step 46 in order to mitigate the effects of the collision. If, however, the determination is negative then a further determination is made in step 48 as to whether, on the current trajectory and speed of the vehicle, and any movement of the human, the vehicle will, within y seconds, enter a condition in which a collision with the human is inevitable. The time period, y, is optionally set and depends on a number of factors, not least of which is what action is intended when the determination is within the period. In any event, if a collision is imminently likely, the vehicle enters a "warning mode" in step 50 in which, for example, the driver may be warned in one or more ways of the impending collision condition. The warning may simply comprise an audible or visible warning, or may be haptic, such as by tightening of the driver seat belt or by a brief application of the brakes. The latter has the advantage of slowing the vehicle slightly and increasing the time available for avoidance action. Finally, the vehicle brake hydraulic system may be pre-charged to prepare the vehicle for braking.

If the detected human is not even in the "pre-collision" zone, then the system can safely ignore the detection in step 52.

Returning to step 42, if the object detected by the camera is probably human with a level of confidence less than 98% then a new determination is made in step 54 as to whether the object is human with a confidence level greater than x %. The value of x is optional, but is likely between 60 and 70%. If this level is exceeded, then the system enters a "Ready Mode" in step 56. Here, the system waits for the PDC system to come into range which, when it does, detects objects in step 58 and makes a determination in step 60 as to whether any object the PDC system detects is consistent with the object detected by the camera system being human. If the answer in step 60 is negative, then the object is ignored in step 52. Likewise, the detection is ignored if the level of confidence determined in step 54 is less than x %.

However, if the answer is positive in step 60, then, in step 46, the vehicle's IEB is applied. In the above description, the emphasis is placed on detection of humans. However, the same system can be employed merely to detect objects, regardless of whether they are human. Also, the system of FIG. 4 may be simplified by the absence of steps 42 to 50 where the camera does not have the requisite sophistication to act alone to invoke the emergency brakes. Likewise, the system may be complicated by additional steps (not shown) between steps 58 and 60 where the PDC is sophisticated enough to have the confidence to act on its own, regardless of the absence of object-detection by the camera, to invoke the IEB.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The invention claimed is:

1. An intelligent emergency braking (IEB) system for a vehicle, the IEB system comprising:
   a) a first detector, comprising a camera;
   b) a second detector, comprising an ultrasonic transceiver; and
   c) a computer, wherein
   d) the camera is adapted to provide the computer with captured image data and the computer is adapted to process the captured image data to detect objects in a field of view of the camera;
   e) the ultrasonic transceiver is adapted to provide the computer with transceiver data and the computer is adapted to process the transceiver data to detect objects in a field of detection of the ultrasonic transceiver; and
   f) the computer is adapted automatically to issue a command to invoke a vehicle braking system in the event that:
      a confidence with which the computer calculates on a basis of the captured image data that there is an object in the field of view of the camera with which the vehicle will collide exceeds a first level of confidence; and
      the ultrasonic transceiver provides the computer with transceiver data consistent with the object detected through the captured image data, wherein
   the ultrasonic transceiver is a component of a parking distance control further comprising a park aid module connected to the ultrasonic transceiver;
   a camera module is connected to the camera;
   the computer is one of the park aid module, the camera module and a separate computer; and
   when the computer determines on the basis of said captured image data that a detected object is a person with a level of confidence greater than said first level, the computer is adapted to prepare the vehicle for immediate braking in anticipation of confirmation of the presence of an object by the ultrasonic transceiver.

2. The IEB system of claim 1, wherein the computer automatically invokes the vehicle braking system in the event that:
 a confidence with which the computer calculates that a detected image captured by the camera is an object exceeds a second predetermined level, higher than said first level; and
 the vehicle will collide with the object.

3. The IEB system of claim 1, wherein the computer automatically invokes the vehicle braking system in the event that:
 a confidence with which the computer calculates that the transceiver data of a detected reflection is from an object exceeds a third predetermined level; and
 the vehicle will collide with the object.

4. The IEB system of claim 1, wherein the camera and computer are not adapted to detect alone and with requisite certainty objects to be avoided;
 and/or wherein the ultrasonic transceiver and computer are not adapted to detect alone and with requisite certainty objects to be avoided.

5. The IEB system of claim 2, wherein transceiver data consistent with the object detected through the captured image data is an ultrasound reflection from an object within the same distance as the detected object and/or from the same direction as the detected object.

6. The IEB system of claim 1, wherein said preparation of the vehicle for immediate braking comprises pre-charging of a hydraulic system associated with the vehicle braking system.

7. The IEB system of claim 1, wherein said computer, being adapted to invoke said vehicle braking system, is adapted to invoke at least one of:
 a) pre-charging a hydraulic system associated with the vehicle braking system in readiness for driver-initiated braking or computer-initiated braking;
 b) issuing audible, visual and/or haptic warning signals of a detected object vehicle or person;
 c) force assistance for driver-actuated brakes;
 d) full brake actuation; and
 e) third party warning systems, such as flashing direction indicator lights.

8. The IEB system of claim 7, further comprising a third detector to detect a rate of deceleration of the vehicle, wherein the computer is adapted, after a driver has actuated the vehicle braking system, to:
 determine if a detected rate of deceleration could be increased to reduce a speed of the vehicle at collision; and, in that event,
 implement full actuation of the vehicle braking system.

9. The IEB system of claim 1, wherein automatic operation by the computer of the vehicle braking system is adapted to be disabled as soon as a driver assumes responsibility for evasion/avoidance of a collision by one or more of appropriate steering, braking or acceleration.

10. The IEB system of claim 9, wherein as soon as the driver assumes responsibility for evasion/avoidance of a collision by one or more of appropriate steering, braking or acceleration the computer of the vehicle braking system is adapted to:
 retain force assistance where driver action is only braking; and
 otherwise to disable automatic operation by the computer of the vehicle braking system.

11. The IEB system of claim 1, wherein the computer is adapted to apply at least some of the vehicle braking system when relative speeds of the vehicle and a detected object and their separation are such that a condition of an inevitable and unavoidable collision will occur within a future time period of less than five seconds.

12. The IEB system of claim 11, wherein the computer is adapted to:
 a) pre-charge a brake hydraulic system in readiness for braking; and
 b) issue audible, visual and/or haptic warning signals of a detected object vehicle or person.

13. The IEB system of claim 1, wherein the computer comprises two distinct algorithms running in separate processors, one in a camera module and one in a park aid module of the vehicle, wherein each algorithm has a tracking algorithm to determine whether an object detected by either module is an object in front of the vehicle, a signaling mechanism in the park aid module sending a signal to the camera module when it detects an object, and the camera module determining a braking decision to invoke the vehicle braking system on detection of an object by the camera when a level of confidence that a captured image is an object exceeds said first level.

14. The IEB system of claim 1, wherein a braking decision by the computer on detection of an object, wherein the level of confidence exceeds said first level, is through a single algorithm running in one of a camera module or a park aid module, with communication of respective detected object data being passed from the other of said camera and park aid modules.

15. The IEB system of claim 1, which is adapted, when the computer determines with a level of confidence greater than said first level that a captured image is of an object, the ultrasonic transceiver issues a higher power pulse than a normal pulse when the vehicle is at a point with respect to the suspected object beyond the ultrasonic transceiver's normal range to determine if the object can be detected sooner than it would otherwise be detected when such normal power pulses are issued.

16. The IEB system of claim 1, wherein a range of the ultrasonic transceiver is between 10 and 20 m.

17. A vehicle comprising the IEB system of claim 1.

18. A method of operating an emergency braking system of a vehicle, wherein the vehicle includes a forward-facing camera and a forward-facing ultrasonic transceiver, the method comprising:
 processing captured image data from the camera to detect objects in front of the vehicle;
 processing transceiver data from the ultrasonic transceiver to detect objects in front of the vehicle; and
 automatically invoking a vehicle braking system when:
  a confidence with which captured image data is calculated to be an object in front of the vehicle, and with which the vehicle will collide, exceeds a first level of confidence; and
  the ultrasonic transceiver provides transceiver data consistent with the object detected through the captured image data,
 wherein when it is determined on the basis of said captured image data that a detected object is a person with a level of confidence greater than said first level, preparing the vehicle for immediate braking in anticipation of confirmation of the presence of an object by the ultrasonic transceiver.

19. The method of claim 18, further comprising invoking the vehicle braking system when:

the confidence with which captured image data is calculated to be an object in front of the vehicle exceeds a second predetermined level, higher than said first level; and the vehicle will collide with the object.

* * * * *

UNITED STATES PATENT AND TRADEMARK OFFICE
CERTIFICATE OF CORRECTION

PATENT NO. : 9,682,689 B2  
APPLICATION NO. : 14/773776  
DATED : June 20, 2017  
INVENTOR(S) : Parker et al.

Page 1 of 1

It is certified that error appears in the above-identified patent and that said Letters Patent is hereby corrected as shown below:

In the Claims

Column 13, Claim 5, Line 22: Please correct "claim 2" to read --claim 1--

Signed and Sealed this  
Third Day of July, 2018

Andrei Iancu  
*Director of the United States Patent and Trademark Office*